US005592997A

United States Patent [19]

Ball

[11] Patent Number: 5,592,997

[45] Date of Patent: Jan. 14, 1997

[54] PEDIATRIC WHEELCHAIR

[76] Inventor: Richard D. Ball, 509 Leeward Ct., Traverse City, Mich. 49684

[21] Appl. No.: 388,909

[22] Filed: Feb. 14, 1995

Related U.S. Application Data

[63] Continuation of Ser. No. 110,731, Aug. 23, 1993, abandoned.

[51] Int. Cl.[6] .................... B60K 1/02

[52] U.S. Cl. .................... 180/65.1; 180/907; 297/423.26; 297/DIG. 10

[58] Field of Search .................... 280/250.1; 180/6.48, 180/6.5, 65.1, 907; 297/423.26, 423.34, 423.36, DIG. 4, DIG. 10

[56] References Cited

U.S. PATENT DOCUMENTS

| | | | |
|---|---|---|---|
| 3,213,957 | 10/1965 | Wrigley | 297/DIG. 4 |
| 3,282,605 | 11/1966 | Nihlean et al. | 297/DIG. 4 |
| 3,618,968 | 11/1971 | Greer | 280/250.1 |
| 3,802,524 | 4/1974 | Seidel | 180/6.5 |
| 3,953,054 | 4/1976 | Udden et al. | 280/250.1 |
| 3,964,786 | 6/1976 | Mashuda | 297/DIG. 10 |
| 4,614,246 | 9/1986 | Masse et al. | 180/6.5 |
| 5,111,899 | 5/1992 | Reimann | 297/DIG. 4 |
| 5,253,724 | 10/1993 | Prior | 180/6.5 |
| 5,275,248 | 1/1994 | Finch et al. | 180/907 X |
| 5,366,036 | 11/1994 | Perry | 180/6.5 X |

FOREIGN PATENT DOCUMENTS

| | | | |
|---|---|---|---|
| 3140014 | 4/1983 | Germany | 280/250.1 |
| 0473579 | 7/1969 | Switzerland | 280/250.1 |
| 2136742 | 9/1984 | United Kingdom | 280/250.1 |
| 2224980 | 5/1990 | United Kingdom | 280/250.1 |

*Primary Examiner*—Kevin Hurley
*Assistant Examiner*—Victor E. Johnson
*Attorney, Agent, or Firm*—Douglas S. Bishop

[57] ABSTRACT

A wheelchair basically designed for mobility impaired children ages 2–6. The wheelchair is especially designed to facilitate the child's access to all objects and activities that would normally be available to a non-disabled child. The chair includes a power base, including large front drive wheels and small rear casters, and a seat that is positioned directly over the drive wheels and that is readily detachable from the base. All components of the wheelchair are positioned inboard of the side edges of the seat and inboard of the front edge of the seat so as to maximize access to areas alongside of and in front of the wheelchair. The axis of rotation of the front drive wheels is generally vertically aligned with the trunk of the child positioned in the seat and the composite center of gravity of the child and wheelchair is positioned slightly behind the axis of rotation of the drive wheels so that the child can tilt the wheelchair forwardly about the axis of the front drive wheels by a simple forward rotation of the child's trunk. The wheelchair also includes a stowable footrest that readily retracts into the base of the wheelchair.

5 Claims, 6 Drawing Sheets

FIG-1
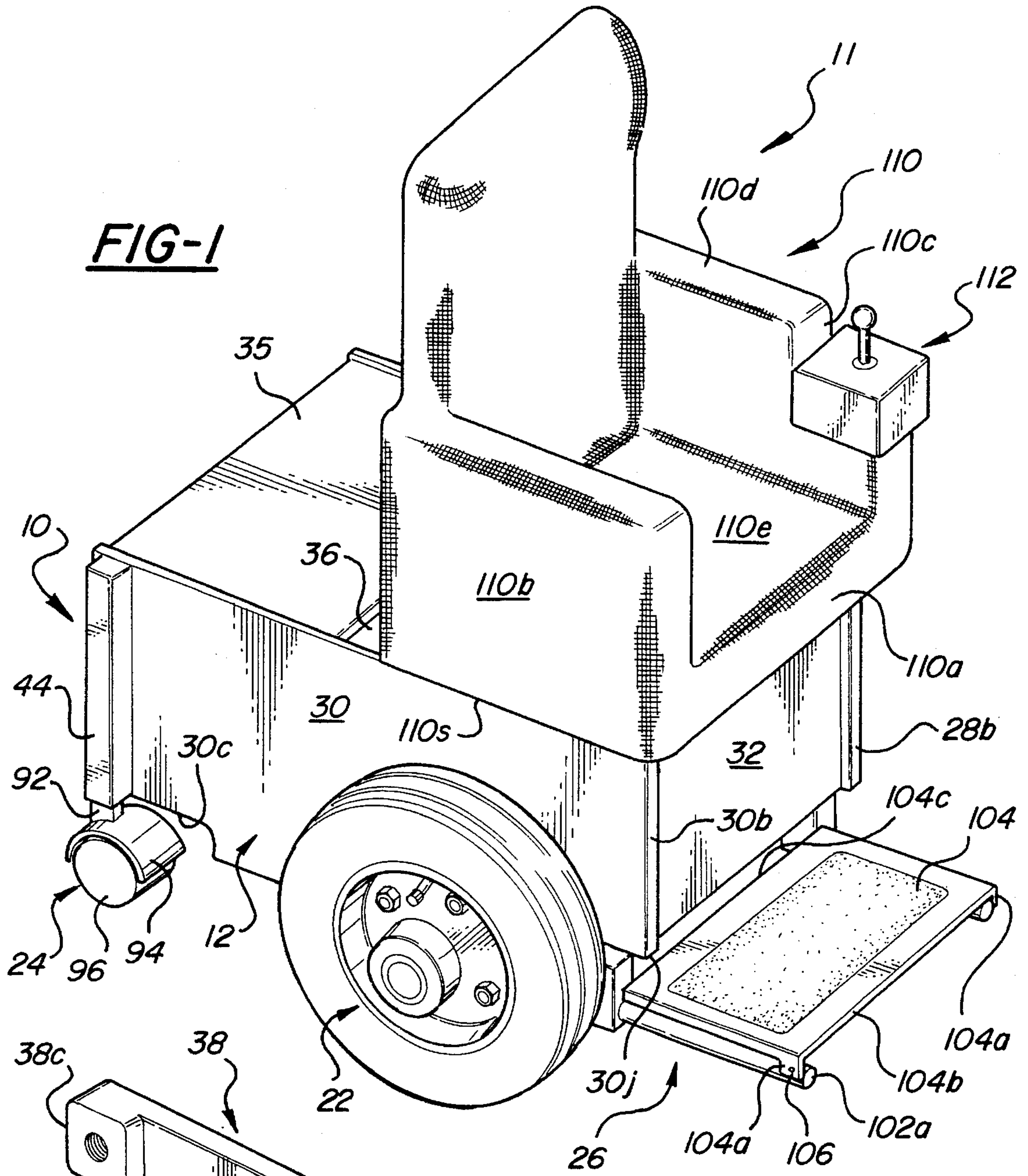
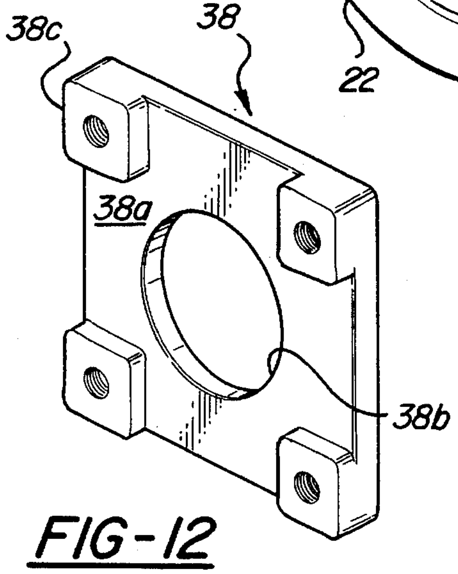
FIG-12
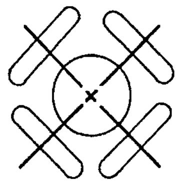
FIG-13
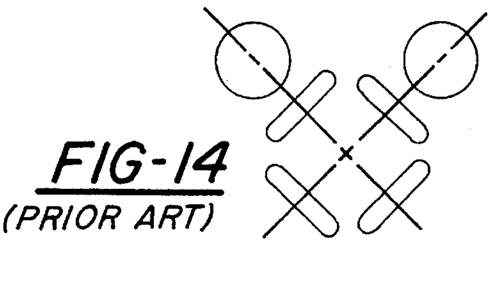
FIG-14
(PRIOR ART)

PEDIATRIC WHEELCHAIR

This is a continuation of application Ser. No. 08/110,731 filed on Aug. 23, 1993, now abandoned.

BACKGROUND OF THE INVENTION

This invention relates to wheelchairs and more specifically to a wheelchair especially suitable for pediatric applications.

Many prenatal and/or perinatal injuries to the central nervous system, for example cerebral palsy, result in a disabled infant/child who cannot walk or crawl and who frequently cannot use the upper extremities in a normal fashion, thus resulting in impaired mobility. A child who is disabled due to cerebral palsy may, however, retain normal or superior intelligence. Speech may or may not be affected. Other diagnoses such as spina bifida, sacral agenesis, etc. may produce similar mobility problems. Disabled children who do not walk and/or crawl need early mobility to explore their environment, to interact with peers, and to perform other mobility related activities that are essential to normal development. This has been a relatively ignored area in the past, although the current opinion within expert circles is now realizing the importance of this issue.

Many disabled children do not have sufficient upper extremity function to propel a non-powered (manual) wheelchair, making an electrically-powered wheelchair an absolute necessity. Disabled children who do not walk frequently cannot sit independently without assistance either. They therefore require specialized seating devices to allow them to sit independently. A seating device for the disabled child must allow them to sit without the aid of either upper extremity, freeing the upper extremities for manual activities to the degree allowed by the child's neurological impairment. Seating for disabled children is highly specific to the individual child, can become quite complex and expensive, and frequently requires substantial expertise.

A powered mobility device for a child of impaired mobility must basically solve two problems. First, it must provide appropriate seating and control of posture and, second, it must provide a means of moving the seating system around the child's environment in a fashion that maximizes access to all objects and activities that would normally be available to a non-disabled child of that age. Various wheelchairs and other mobility devices are commercially available for children in the two-to-six year old age range. These devices are all adaptations of devices produced for other purposes or for adults/young patients. As such, they do not satisfy the functional requirements of mobility impaired children in the two-to-six year old age group.

Specifically, an optimal mobility device must allow a disabled child good access to the floor or ground with the hands, the primary play surface for children of this age.

Further, an optimal mobility device must allow a disabled child unimpeded access with the hands to vertical surfaces such as cabinets (to reach the handle) or furniture, for example a dresser (to pull out a drawer).

Further, an optimal mobility device must allow a disabled child to negotiate within spaces as small as 16–18 inches wide (for example between furniture) and allow a 360° turn within an area as small as 20–24 inches.

Further, an optimal mobility device must not physically place a disabled child vertically and horizontally remote from peers of similar age and size, producing social and physical isolation.

Further, an optimal mobility device must be relatively small in size and light in weight so as to enable the device to be transported by relatively small people (for example single mothers) and must be small enough to be usable in small environments such as trailers and small enough to be readily loaded into and unloaded from relatively small motor vehicles.

As noted, the existing commercially available mobility devices do not satisfy these requirements.

SUMMARY OF THE INVENTION

This invention is directed to the provision of a wheelchair that is especially designed to accommodate the needs of impaired mobility children in the two to six year age group.

More specifically, this invention is directed to the provision of a pediatric wheelchair which provides good access to the floor or ground, unimpeded access with the hands to vertical surfaces, and ready access to peers.

A more specific object is to provide a pediatric wheelchair that is light in weight and small in size so as to maximize its portability and usability even in cramped quarters.

The invention pediatric wheelchair is of the type including a seat defining a generally horizontal seating surface and drive wheels for propelling the wheelchair over a support surface. According to an important feature of the invention, all components of the wheelchair are positioned or positionable inboard of the side edges of the seat and inboard of the front edge of the seat and the drive wheels are positioned immediately beneath the seating surface with the vertical axis of rotation of the wheel complex generally vertically aligned with the trunk of a child positioned on the seating surface. This arrangement allows the child direct and close access to objects proximate the sides of the wheelchair as well as proximate the front of the wheelchair and places the child in a commanding position over the drive wheels.

According to a further feature of the invention, the wheelchair is free to pivot forwardly and downwardly about the axis of rotation of the wheels. This arrangement allows the child to tilt the wheelchair forwardly by forward rotation of the child's trunk so as to further improve the access of the child to the floor in front of the chair.

According to a further feature of the invention, the distance from the support surface for the wheelchair to the top of the seating surface is only minimally larger than the diameter of the wheels and the distance from the axis of rotation of the wheels to the top of the seating surface is no greater than the diameter of the wheels. This arrangement provides a low overall profile for the wheelchair and positions the child relatively close to the support surface of the wheelchair.

According to a further feature of the invention, the wheelchair includes a frame assembly including a forward lower corner structure forwardly of the axis of rotation of the drive wheels and radially outwardly of the outer periphery of the drive wheels and the frame assembly may rotate forwardly and downwardly about the axis of rotation of the drive wheels to a forwardly tilted position in which the forward lower corner structure of the frame assembly engages a support surface. This arrangement allows the child to tilt the wheelchair forwardly to improve the access of the support surface and limits and defines the maximum extent of forward tilting movement of the wheelchair. In the disclosed embodiment of the invention, the frame assembly includes a frame and a footrest assembly mounted on the front end of the frame for movement between an operative position and a stowed position, and the stowed footrest defines the forward lower corner structure of the frame assembly.

According to a further feature of the invention, the wheelchair includes a base structure defining an upper generally planar support surface, the wheels include large drive wheels proximate the front end of the wheelchair outboard of the base structure and small caster wheel means proximate the rear end of the wheelchair, and the seat is fixedly secured to the planar support surface of the base structure with the seating surface positioned directly over the axis of the large front drive wheels and with the forward edge of the seating surface at least as far forwardly as the forward edge of the front drive wheels.

According to a further feature of the invention, with the child positioned on the seating surface in a forwardly facing position, the composite center of gravity of the wheelchair and child is positioned generally on a vertical line passing through or slightly behind the horizontal axis of rotation of the large front drive wheels and the wheelchair is free to pivot forwardly and downwardly about the rotation axis so that a child positioned on the seating surface can tilt the wheelchair forwardly about the axis by a simple forward rotation of the child's trunk. In the disclosed embodiment of the invention, the vertical line of the composite center of gravity of the wheelchair and child is positioned slightly behind the horizontal axis of rotation of the wheels.

According to a further feature of the invention, the seat is positioned on an upper generally planar support surface defined by the base structure and proximate the front end of the base structure in general overlying relation to the front drive wheel, electric motor drive means are positioned on the base structure beneath the seat and drivingly engaging the drive wheels, and a battery is connected to the drive means and positioned within the base structure rearwardly of the seat under an easily removable cover. This arrangement provides compact packaging for the vehicle and provides ready and convenient access to the battery for replacement and recharging purposes.

According to a further feature of the invention, the wheelchair includes a stowable footrest that easily retracts into the base of the wheelchair in a manner that takes up essentially no space and which does not require removal of any parts of the wheelchair. This arrangement provides a footrest when it is necessary, for example when the child is traveling a relatively long distance and it would be fatiguing to hold the feet up off of the ground to no purpose, yet allows the footrest to be eliminated when it is not needed and would only interfere with the wheelchair access to vertical surfaces in front of the wheelchair, interfere with the child's access to the support surface immediately in front of the wheelchair, and limit the ability of the wheelchair to pivot forwardly to provide access to the floor. It is undesirable to have a footrest that simply detaches from the chair since this requires that the whereabouts of the footrest be monitored so that it does not become lost and it also requires that the need for the footrest be anticipated so that it is available when necessary.

According to a further feature of the invention, the base structure includes a frame including a pair of spaced parallel side plates, the drive wheels are mounted outboard of the side plates, and the electric motor drive means are positioned in a hollow defined laterally between the side plates. This arrangement minimizes the possibility of injury to small limbs by eliminating moving and/or open machinery such as belts, chains, etc., in the drive system for the wheelchair. Specifically, the electric motor drive means are connected to the front drive wheels through the side plates so that all moving parts of the drive system are positioned in the hollow of the base structure between the side plates.

According to a further feature of the invention, the driving connection between each drive motor assembly and the respective drive wheel includes a slipping clutch assembly to limit the torque transmitted to the wheel by the drive motor assembly. This protects both the child operating the chair and other children in the environment from injury should a body part be caught between the wheelchair and a fixed object while drive power is being applied.

According to a further feature of the invention, each driving connection further includes a flexible coupling to cushion the application of driving force to the wheel. This improves the control over the wheelchair when the child's coordination is poor and abrupt control inputs cannot be avoided.

According to a further feature of the invention, the base structure and the seat are designed as totally separate entities so that the seat is not dedicated to the particular base structure but rather may be rapidly disconnected from the base structure, connected to another base structure, or to a totally different base structure designed for example to fit on a standard dinner chair or other comparable piece of furniture. This arrangement allows a single seat to serve multiple seating functions and specifically allows the expensive custom designed seat required for the particular disability of an impaired child to realize maximum utilization in the total life style of the child. This readily separable arrangement also facilitates transport and storage of the wheelchair since the seat and the base structure may be individually transported and individually stored. Further, in the event of a malfunction of the drive system of the base structure, a replacement base structure may be shipped by overnight delivery to be used immediately by simple substitution while the malfunctioning base structure is returned for repairs. This is in contrast to current commercial wheelchairs in which, in the event of a malfunction, the wheelchair is out of service, and of no use to the child, until the entire unit can be repaired by a qualified individual.

BRIEF DESCRIPTION OF THE DRAWINGS

FIG. 1 is a perspective view of a pediatric wheelchair according to the invention;

FIG. 12 is a detail perspective view of a mounting plate utilized in the invention wheelchair;

FIG. 13 is a schematic view showing the rotation of the invention wheelchair about a vertical axis; and FIG. 14 is a schematic view showing the rotation of a prior art wheelchair about a vertical axis.

DETAILED DESCRIPTION OF THE PREFERRED EMBODIMENT

Figures 2, 8, 9:
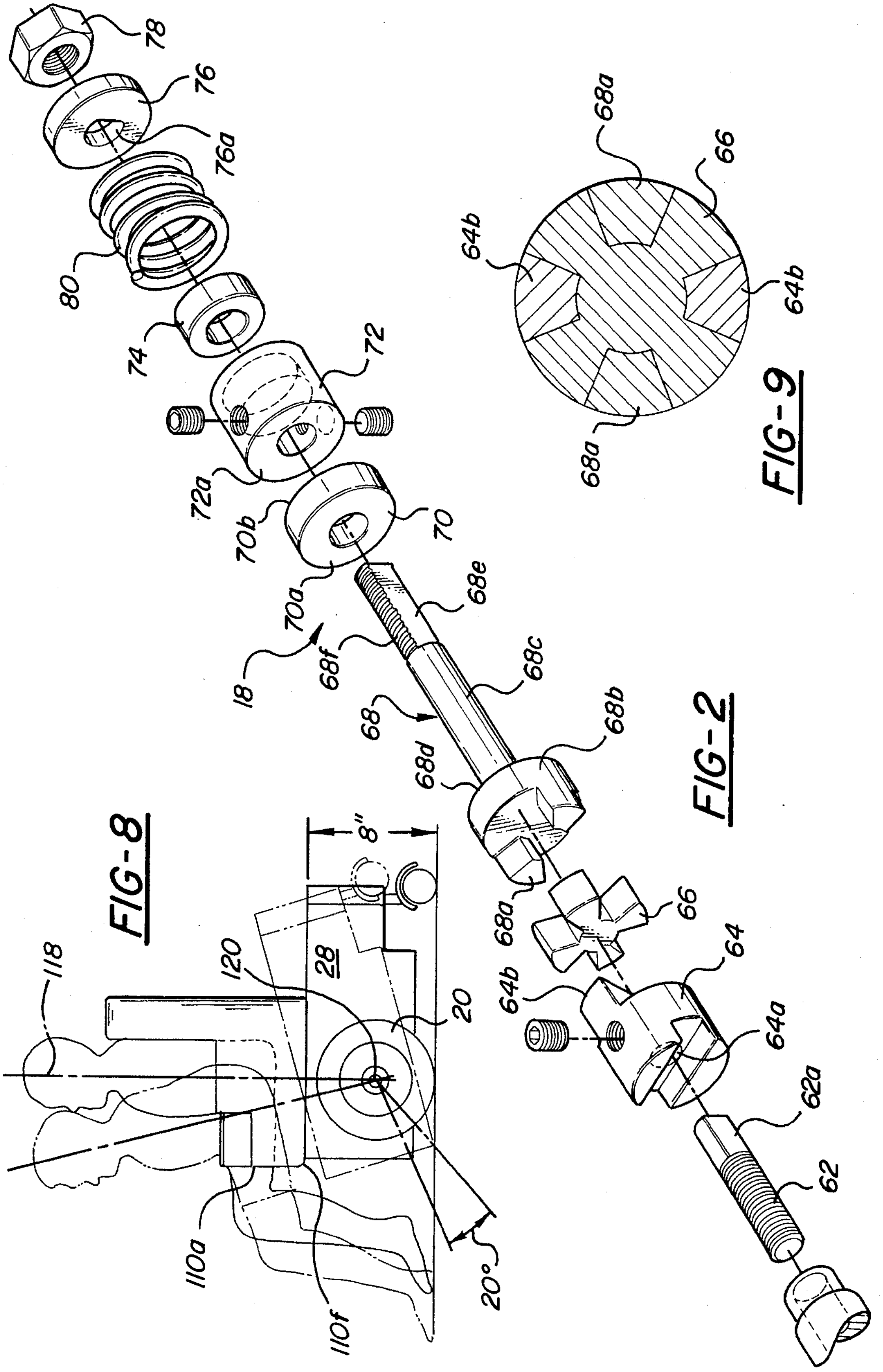
FIG. 2 is an exploded perspective view of a drive assembly utilized in the invention wheelchair.
FIG. 8 is a side elevational view of the invention wheelchair showing the manner in which the wheelchair may be readily tilted forwardly by a mobility impaired child.
FIG. 9 is a detail view of a compliant coupling utilized in the invention wheelchair.
Figure 3:
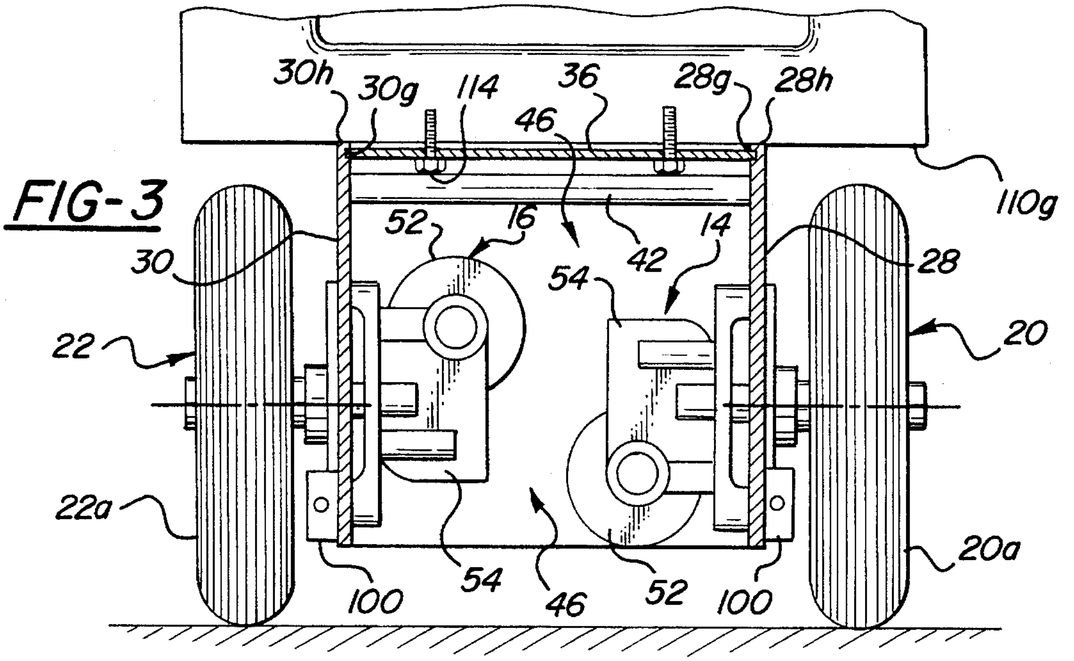
FIG. 3 is a fragmentary front end view of the invention wheelchair.

The invention wheelchair, broadly considered, includes a base structure 10 and a seat assembly 11.

Base structure 10 includes a frame 12, front drive motor assemblies 14 and 16, clutch assemblies 18, drive wheels 20 and 22, caster wheels 24, and a footrest assembly 26 coacting with the frame 12 to form a frame assembly.

Frame 12 is generally of a rectangular prismatic configuration and includes side plates 28 and 30, a front end plate 32, a rear end plate 34, a rear top plate 35, a front top plate 36, inboard mounting plates 38, outboard bearing plates 40, a battery support plate 41, a partition plate 43, struts or tubes 42, and beams 44.

Each side plate 28,30 has a generally rectangular configuration and includes a downwardly opening slot **28*a*, 30*a* proximate the front end 28*b*, 30*b* of plate and a cutout 28*c*, 30*c*** proximate the lower rear corner of the plate.

Front end plate 32 is generally of a rectangular configuration and fits slidably in vertical grooves **28*d*, 30*d* formed on the inboard faces of side plates 28 and 30 proximate their front edge 28*b*, 30*b***.

Rear plate 34 is of size and configuration generally corresponding to front plate 32 and fits slidably in vertical grooves **28*e*, 30*e* formed on the inboard face of side plates 28 and 30 proximate the rear edges 28*f*, 30*f*** of the side plates.

Top plates 35,36 have a composite length corresponding to the length of side plates 28 and 30 and a width corresponding generally to the width of front and rear plates 32 and 34 and fit slidably, in back-to-back relation, in horizontal grooves **28*g*, 30*g* provided on the inboard face of the side plates, proximate the upper edges 28*h*, 30*h*** of the side plates.

Battery support plate 41 has a rectangle configuration and fits slidably in horizontal grooves **28*i*, 30*i* in plates 28, 30 and partition plate 43 has a rectangular configuration and fits slidable in vertical grooves 28*j*, 30*j* in plates 28,30. Battery support plate 41, partition plate 43 and rear plate 44 coact to define a battery compartment 45 for containing a battery 47. Battery 47 may be accessed for removal, replacement or repair by simply sliding rear top plate 35 rearwardly in slots 28*g*, 30*g***.

Side plates 28,30, front end plate 32, rear end plate 34, and top plates 35,36 will be seen to provide a box-like structure defining a downwardly opening hollow 46 therewithin.

Struts and tubes 42 extend laterally between the inboard faces of side plates 28 and 30 to maintain the lateral spacing between the side plates and provide structural rigidity for the frame structure. Three struts 42 are shown, one proximate the front end of the frame structure, one proximate the rear end of the frame structure, and one proximate the mid portion of the frame structure. The number and size of struts will obviously vary depending upon the particular envisioned application. Each strut consists of a metal tube with a threaded insert fastened within each hollow end cavity of the tube and is maintained in position between the side plates by bolts 49 passing through plates 28,30 for engagement with the threaded inserts in the tube ends. The heights of the struts 42 relative to the upper and lower edges of the side plates is staggered to maximize the structural rigidity provided by the struts. A beam 44 is positioned outboard of the rear edges of each plate 28,30.

Each inboard mounting plate 38 has a generally rectangular configuration and includes a main body planar portion **38*a* defining a central aperture 38*b* and pad portions 38*c* at each corner of the plate. Each inboard mounting plate is positioned against the inboard face of a respective side plate 28,30 with aperture 38*c* aligned with the slot 28*a*, 30*a*** of the side plate.

Each outboard bearing plate 40 has a generally rectangular configuration and includes a generally planar main body portion **40*a* and a central hub portion 40*b*. Each outboard bearing plate is positioned against the outboard face of a respective side plate 28,30 with the central axis 47 of the hub portion aligned with slot 28*a*, 30*a* and with the central axis of the inboard mounting plate aperture 38*b*. Bolts 48 pass through apertures in each outboard bearing plate and through the respective side plates for threaded engagement with threaded bores provided in the pad portions of the respective inboard mounting plate to clamp the plates against the inboard and outboard faces of the side plate with the central axis 47 of the hub portion of the outboard bearing plate aligned with the central axis of the aperture of the inboard mounting plate and with axis 47 passing through the respective side plate slot 28*a*, 30*a***.

Each drive motor assembly 14, 16 includes a DC electric motor 52 and a gear reduction unit 54. Each drive motor assembly 14,16 may for example comprise a Series E windshield wiper motor assembly, Ford Motor Company part no. F7ZZ-17508A. It will be seen that motor assemblies 14 and 16 are positioned in the hollow 46 of the frame in side-by-side relationship proximate the front end of the frame with motor assembly 14 arranged with its drive motor 52 beneath the gear reduction unit 54 and motor assembly 16 arranged with its drive motor 52 above the gear reduction unit 54. This inverted relationship of motor assembly 14 relative to motor assembly 16 enables the units to occupy a staggered relationship with respect to each other so that, if desired, each of the motors 52 may extend over the longitudinal center line 56 of the frame to optimize the lateral compactness of the base structure.

Motor assemblies 14 and 16 are respectively secured to an inboard mounting plate 38 by bolts connecting the gear reduction unit of each motor assembly to the inboard face of the inboard reinforcing plate. With the motor assemblies thus mounted within the hollow 46 on the mounting plates 38, the output shaft 60 of the respective gear reduction unit 54 is aligned with a respective central axis 47.

Each clutch assembly 18 includes a shaft 62, a coupler 64, a flexible elastomeric coupling 66, a coupler 68, a clutch disk 70, a housing 72, a bearing 74, a non-rotating washer 76, a nut 78, and a spring 80.

Each wheel assembly 20, 22 includes a wheel 82, an axle 84, and a pneumatic tire 86.

Wheel 82 includes a hub portion **82*a*, a flange portion 82*b*, and a rim portion 82*c* mounting the pneumatic tire 86 in known manner. Axle 84 is positioned within hub 82*a* and is secured thereto in known manner utilizing set screws 88**.

Figure 7:
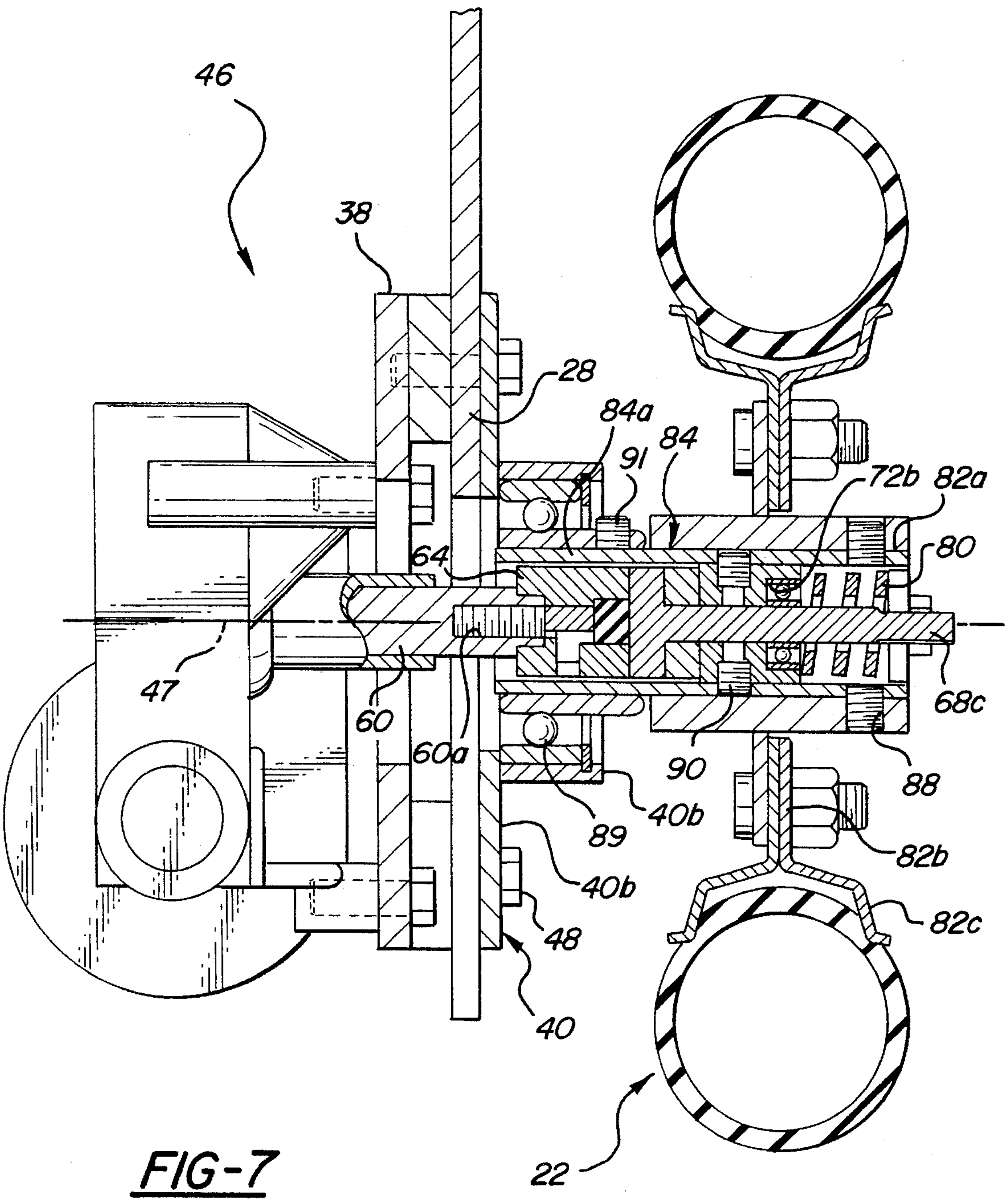
FIG. 7 is a cross-sectional view taken on line 7—7 of FIG. 6.
Figure 10:
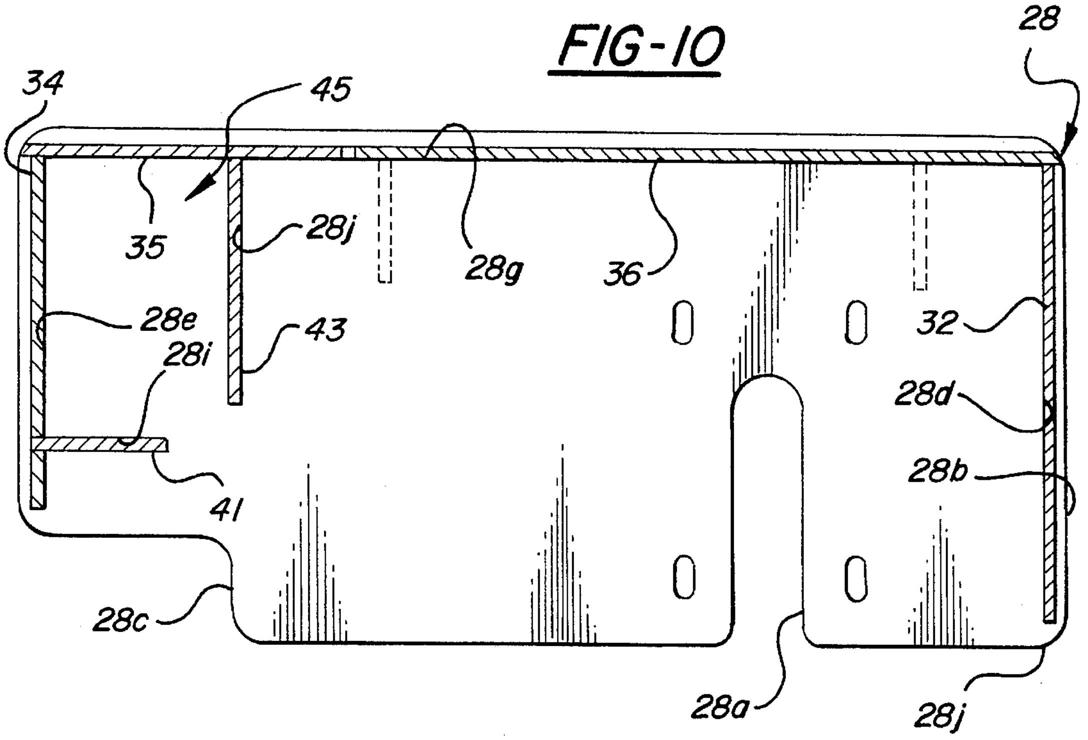
FIG. 10 is a view of a side plate utilized in the invention wheelchair.
Figure 11:
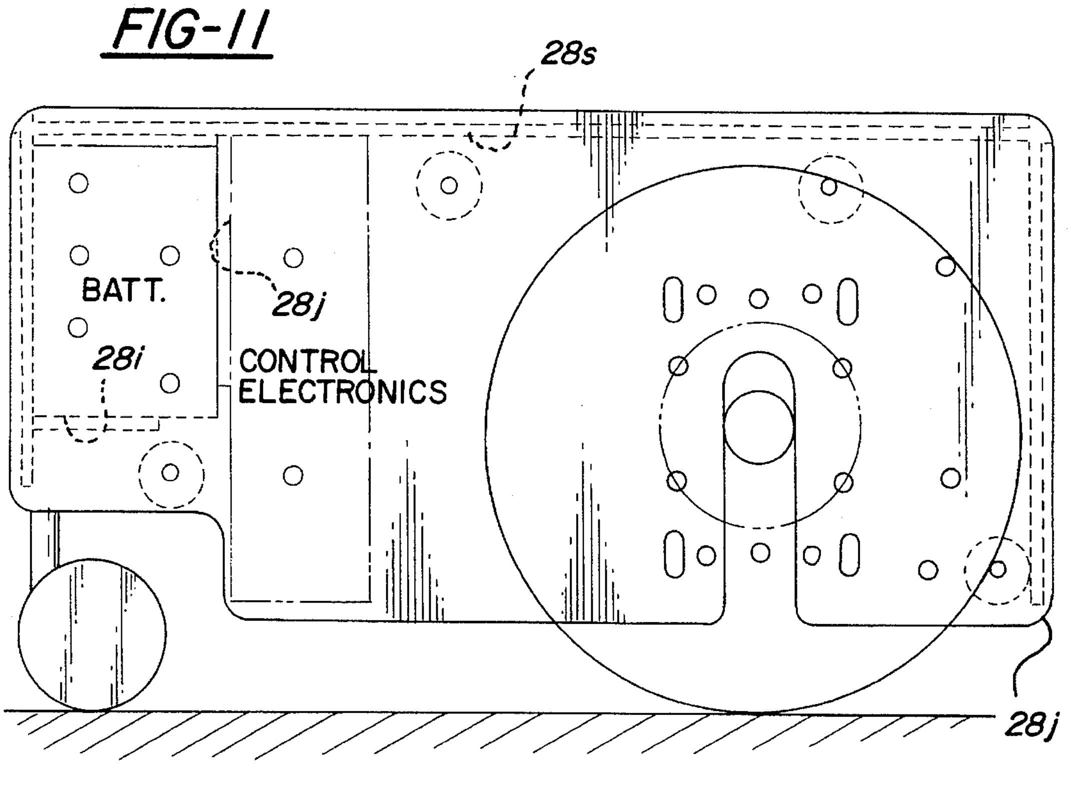
FIG. 11 is a diagrammatic view showing the relationship of various components of the invention wheelchair.

The assembled relation to the wheel assemblies and the clutch assemblies is seen in FIG. 7 wherein shaft 62 is threadably received in a threaded bore **60*a* in the outboard end of gear reduction unit output shaft 60; coupler 64 is fitted over the outboard end of shaft 62 with a shaft flat 62*a*** engaging a flat in the central aperture 64*a* of the coupler and a set screw 87 engaging the shaft to provide a positive driving connection between shaft 62 and coupler 64; circumferentially spaced segments 68*a* on the head portion 68*b* of coupler 68 intermeshingly engage with circumferentially spaced segments 64*b* on the coupler 64 with flexible elastomeric coupling 66 interposed between the segments of coupler 64 and the segments of coupler 68 to cushion the drive between the couplers; clutch disk 70 is positioned on the shaft portion 68*c* of coupler 68 with its inboard face 70*a* abutting the outboard face 68*d* of coupler head portion 68*b*; housing 72 is positioned on coupler shaft portion 68*c* with its inboard face 72*a* abutting the outboard face 70*b* of clutch disk 70; bearing 74 is received in a counterbore 72*b* proximate the outboard end of housing 72 with its inner race positioned on coupler shaft portion 68*c;* washer 76 is nonrotatably mounted on coupler shaft portion 68*c* with washer flat 76*a* engaging coupler shaft portion flat 68*e;* nut 78 is threaded onto the outboard threaded end 68*f* of coupler shaft portion 68*c* outboard of washer 76; coil spring 80 is interposed between the inboard face 76*b* of the washer and the outboard face of housing 72; axle 84 is journalled in a bearing 89 mounted in the hub portion 40*b* of outboard bearing plate 40 with the clutch assembly positioned within the axle; the axle is fixedly secured to housing 72 as by set screws 90; and the axle and wheel assembly 22 are secured to the frame by two set screws 91 located in the extended outboard inner race of the bearing.

The wheel assembly and clutch assembly provide a driving connection between the respective motor assembly and the respective wheel assembly in which clutch slippage may occur at the interface of the head portion 68*b* of coupler 68 and the inboard face 70*a* of the clutch disk 70 as well as at the outboard face 70*b* of the clutch disk and the inboard face 72*a* of the coupling, whereby to provide a torque limiting feature to the drive assembly. Further, the driving connection includes a flexible coupling in the form of the flexible elastomeric coupling 66 which functions to cushion the application of driving force to the wheel assembly from the motor assembly so as to provide rotary shock absorption to protect the total assembly against overly abrupt acceleration.

It will be seen that each wheel assembly and the associated portion of the clutch assembly outboard of the elastomeric coupling 66 may be removed from the base assembly for replacement and repair simply by loosening the two set screws in the extended inner bearing race and sliding the axle outwardly through the bearing race. The entire drive motor assembly, inboard mounting plate 38, outboard mounting plate 40, clutch assembly and wheel assembly 22 can be removed for replacement and repair simply by loosening the bolts 48 and sliding the entire assembly downwardly through the side frame plate opening 30*a*. The clutch slippage forces are adjusted by the choice of the spring constant for spring 80 and by adjusting the threaded position of nut 78 on threaded coupler shaft portion 68*f* so as to selectively vary the compression of the spring.

Caster wheels 24 are of known form and each include a swivel pin 92 rotatably received in a suitable socket in the lower end of a respective beam 44; a shield 94; and a wheel 96.

Figure 4:
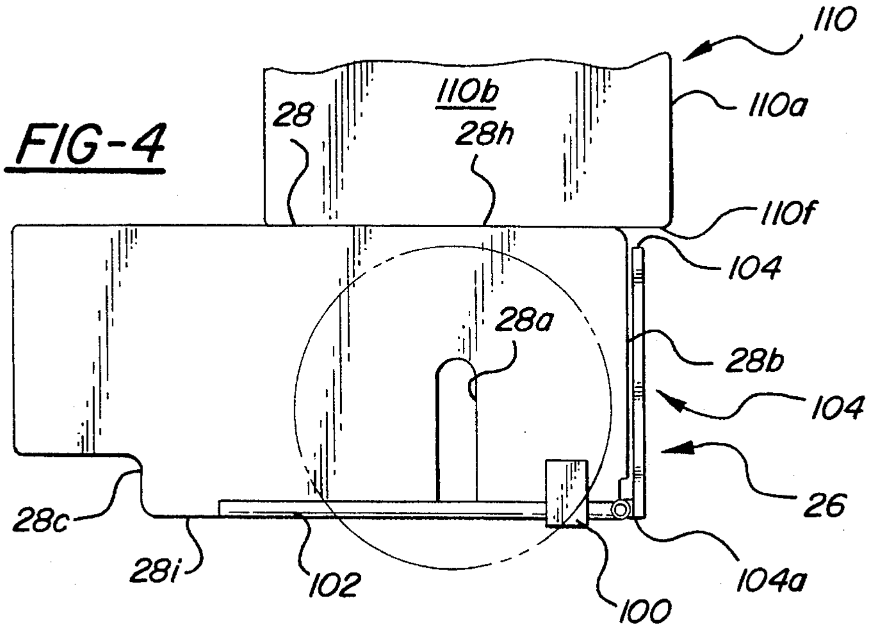
FIGS. 4 and 5 are detail views showing a retractable, stowable footrest utilized in the invention wheelchair.
Figure 5:
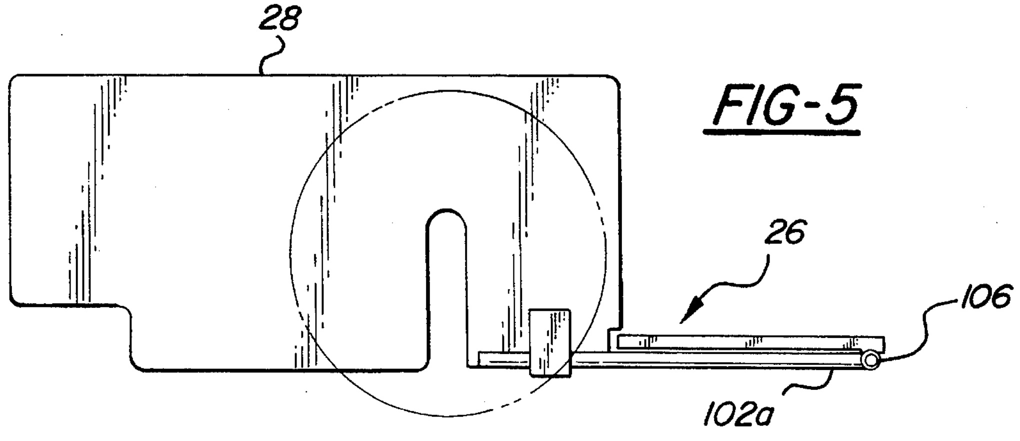
Figure 6:
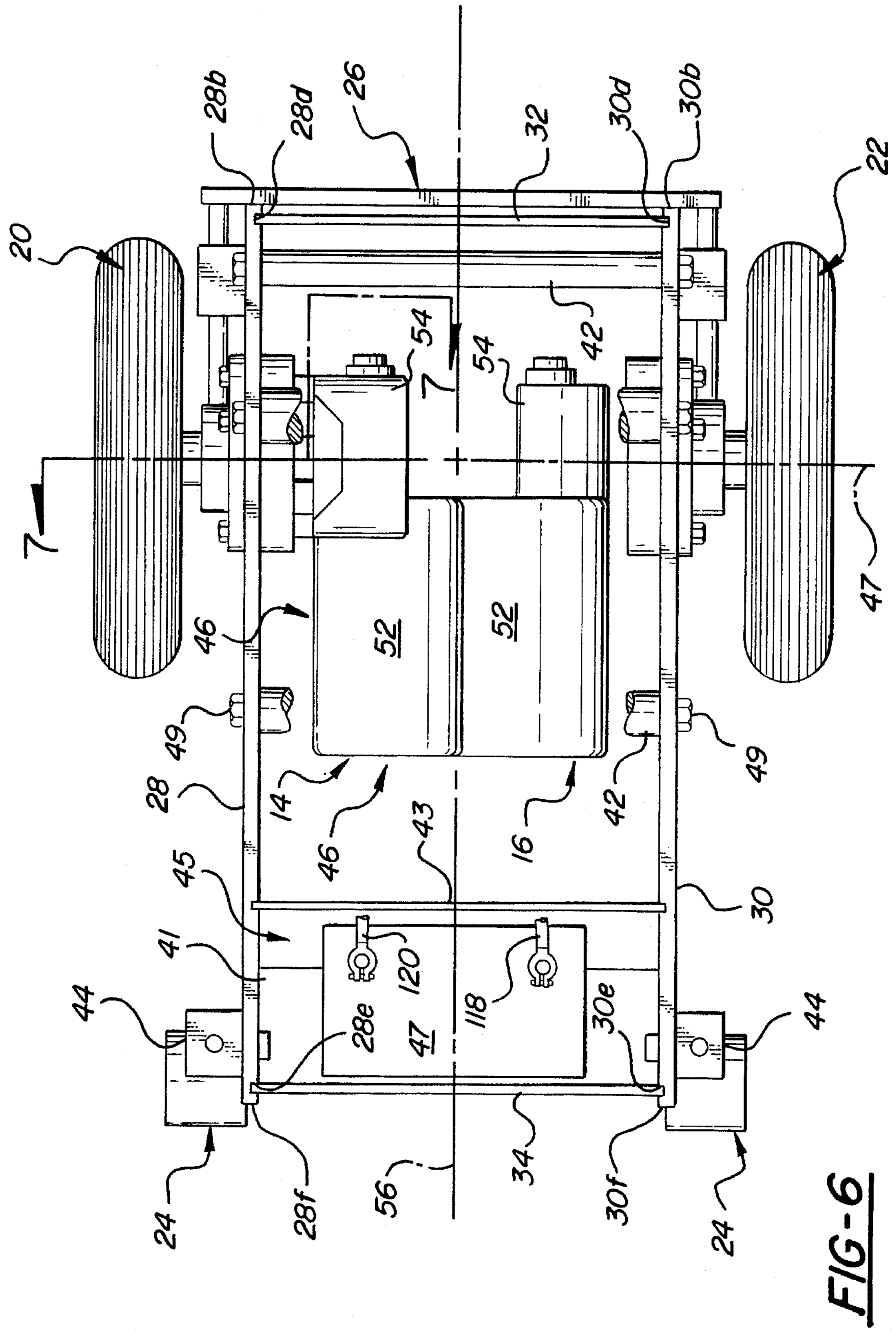
FIG. 6 is a plan view of the invention wheelchair with the seat removed.

Footrest assembly 26 includes a mounting block 100 secured to the outboard face of each side plate 28,30 proximate the lower front end 28*b*,30*b* of the side plate; a guide rod 102 slidably mounted in each mounting block and extending generally parallel to and proximate the lower edges 28*i*, 30*i* of the side plates; and a planar footrest 104. Footrest 104 includes lugs 104*a,* a front edge 104*b* and a rear edge 104*c*. The footrest is pivotally mounted to the front ends 102*a* of the guide rods by a pivotal connection 106, carried by lugs 104*a,* for movement between an operative position, seen in FIGS. 1 and 5, in which the guide rods 102 are extended and the footrest 104 is pivoted rearwardly and assumes a horizontal position in overlying relation to, and supported by, the guide rods 102, and a stowed position, as seen in FIG. 4, in which the guide rods have been retracted and the footrest 104 is pivoted upwardly to a vertical position in which it extends parallel to and proximate to the front plate 32 of the frame with its rear edge 104*c* disposed proximate to but below the upper edge 28*h,* 30*h* of the side plates.

Seat assembly 11 includes a seat 110 and a control unit 112.

Seat 110 is positioned on the side plates 28,30 with the front edge 110*a* of the seat positioned slightly forwardly of the front edge 28*b*, 30*b* of side plates 28,30 to define a small overhang portion 110*f* which allows the footrest 104 to be positioned beneath the seat with the footrest in its stowed position so that the front edge 110*a* of the seat is positioned outboard of the stowed footrest. The side edges 110*b* of seat 110 are positioned outboard with respect to the outboard faces of side plates 28, 30 so as to define overhanging seat portions 110*g* positioned over wheels 22 and 20 with the seat side edges positioned outboard of the outboard wheel edges 20*a*,22*a*. Seat 110 is secured to front top plate 36 by fasteners 114 passing upwardly through front top plate 36 for engagement with the underface of the seat. The seat is easily removed from the base structure by sliding the top plate, with the attached seat, outwardly in grooves 28*g*,30*g* so as to allow the seat to be used for other purposes such as on a dining chair. It will be understood that seating for disabled children is highly specific to the individual child, can become quite complex, and frequently requires substantial expertise in conforming the seat to the specific needs and disabilities of the child. The seating therefor is quite expensive and it is therefore advantageous to have the seat perform a multi-use function where, on the one hand, it may provide the seat for use in the pediatric wheelchair and, on the other hand, it may be quickly removed form the base of the wheelchair to allow the seat to be used by the child in other environments. Any suitable quick disconnect arrangement may be utilized to securely but readily detachably secure plate 36 to the wheelchair base.

With particular reference to FIGS. 1 and 8, it will be seen that the seating surface 110 of the seat is positioned very low with respect to the support surface for the wheelchair. In particular, seating surface 110*e* is positioned immediately above the drive wheels 20,22 and, specifically, the distance from the axis of rotation 47 of the drive wheels to the seating surface 110*e* is less than the diameter of the drive wheels. In a particularly advantageous embodiment of the invention, the distance from the axis of rotation 120 of the drive wheels to the seating surface 110*e* is approximately 0.75 of the diameter of the wheels and the distance from the support surface to the mounting structure for the seat is approximately 8 inches.

Control 112 is positioned in a cutout 110*c* in the left arm rest 110*d* of the seat and may be, for example, of the well known "joystick" type in which forward and rearward movements of the stick product forward and rearward movements of the wheelchair and left and right movements of the joystick product left and right movements of the wheelchair by individually braking and propelling the respective left and right wheels. It will be understood that the control 112 controls the motor assemblies 14 and 16 individually so that, in known manner, one wheel may be braked while the other wheel is accelerated and vice-versa. With each motor assembly thus controlled for operation independently of the other, for rotation in either direction and at any speed within a given speed range, and with the rear caster wheels freely rotating and castered, the wheelchair is readily maneuverable in confined spaces and can be turned within its own length.

FIGS. 13 and 14 demonstrate the effects of chair rotation on the position of the child's body when the vertical axis of rotation of the chair is co-located with the vertical axis of rotation of the child's trunk as well as when the vertical axis of rotation of the chair is located behind the vertical axis of rotation of the child's trunk. Specifically, as seen in FIG. 13, illustrating the arrangement of the present invention, rotation of the child's trunk to move the wheelchair about a vertical axis does not result in any significant lateral translation of the child's trunk, as compared to the prior art arrangement of FIG. 14, where the child's trunk is positioned ahead of the axis of rotation so that rotation of the wheelchair produces significant lateral translation of the child's trunk relative to the axis of rotation which is very undesirable in situations such as sitting at a table.

Battery 47 is suitably positioned in battery compartment 45 and is connected in known manner to the individual controllers for motor assemblies 14,16 by individual cables (not shown). Removable rear top plate 35 allows the battery to be readily replaced without removing the child from the chair in the event that the battery is discharged to a point where the motors will not function. Top plate 35 also allows the battery to be readily removed to reduce the weight of the wheelchair for transport purposes.

The invention wheelchair will be seen to provide many important advantages for a mobility impaired child.

For example, and very importantly, the invention wheelchair allows the seating system accommodating the child be moved around the child's environment in a fashion that maximizes access to all objects and activities that would normally be available to a non-disabled child of that age.

Specifically, the wheelchair allows a disabled child good access to the floor or ground with the hands, the primary play surface for children of this age, allows the disabled child unimpeded access with the hands to a vertical surface such as a cupboard cabinet or the front of furniture, allows the disabled child to negotiate within the narrow spaces encountered, for example, between furniture and allows a 360° turn with the length of the chair. In particular, the fact that all of the components of the wheelchair are inboard of the side edges of the seat allows the child direct access to vertical surfaces, the fact that all of the wheelchair components are inboard of the front edge of the seat allows the child to directly access areas in front of the wheelchair, and the extremely low overall profile of the wheelchair, and in particular the proximity of the seating surface **110*e*** to the support surface of the wheelchair, places the child's hands in close proximity to the floor or other play surface.

Further, as best seen in FIG. 8, the vertical plane 118 containing the axis of rotation 120 of the wheels 20,22 is vertically aligned with the trunk of the child seated in the seat so that the child may tilt the wheelchair forwardly about the axis of rotation of the wheels 120 by simply forward movement of the child's trunk. This forward tilting movement is defined and delimited by the engagement of the lower front corner structure of the frame assembly with the support surface for the wheelchair. Specifically, depending on design parameters, the engagement of the lower front corner structure of the frame assembly may occur as engagement of the support surface by lower front corners **28*j*, 30*j* of the frame side plates 28, 30 and/or may occur as engagement of the support surface by lower front portions of the stowed footrest assembly 26. It will be seen that the lower front edge of the stowed footrest 104 defines a forward tilting corner limiting edge extending across the entire front of the wheelchair. The ability of the child to tilt the wheelchair forwardly by forward rotation of his trunk is augmented by the fact that almost all of the weight of the wheelchair is concentrated proximate the axis of rotation 120 of the wheels so that the composite center of gravity of the wheelchair and the child is located proximate the vertical plane 118 and so that slight forward movement of the trunk of the child shifts the center of gravity of the child and wheelchair to a location forwardly of the plane 118 to generate the desired forward tipping to improve the child's access to the floor surface. The permitted tipping may comprise for example between 15 and 20°. The footrest 104** must be in a stowed position for the maximum tilt to occur in that tipping is limited to only 2–3° when the footrest is in the operative position.

Further, the arrangement whereby the seat may be readily removed from the power seat base provides a versatility of use not found in other mobility devices. Specifically, the detachability of the seat allows the seat to be used for other seating purposes, such as dining purposes, and further, in the event of malfunction of the power seat base, allows the seat and power seat base to be readily separated to allow the power seat base to be returned to a repair facility without depriving the child of the seat for other purposes. It is further envisioned in this regard that provision may be made to replace the malfunctioning power seat base with another power seat base during the time that the malfunctioning power seat base is under repair.

Further, the location of the battery in the rear portion of the base structure under a readily removable cover allows the battery to be readily removed for replacement or recharging without disturbing any of the other elements of the wheelchair and without disturbing a seated child.

Further, the provision of all of the drive means within the cavity defined within the frame of the base structure, with the power to the wheels passing outwardly through the side plates of the frame, virtually eliminates all moving machinery such as belts, chains, et cetera, that could injure small limbs.

Further, the torque limiting feature built into the clutch assembly for each wheel avoids injury to the child or playmate in situations where the controls are inadvertently stuck at full force.

Further, the elastomeric coupling 66 provides compliance in the drive mechanism to the wheels to cushion application of force to the wheels and thereby avoid any unnecessary jerky-type motion during starting and stopping which would be difficult for a mobility impaired child to control.

Further, the stowable foot rest assembly provides support and positioning for the feet of the mobility impaired child when desired and is readily movable to a stowed position which is inboard of the front edge of the seat of the wheelchair so as to not impede access of the child to areas in front of the wheelchairs.

Further, the invention wheelchair has an extremely light weight (for example, 20 lbs, total) to enable the wheelchair to be readily transported by even very small adults such as a mother of small physical stature.

Further, the invention wheelchair has a very compact configuration enabling the wheelchair to be utilized in very crowded situations such as encountered in trailers and other space limited housing accommodations, and further allows the wheelchair to be readily transported in relatively small compact automobiles.

Further, the invention wheelchair may be produced at a price that is a small fraction of the price of conventional pediatric wheelchairs so that it will be within the financial means of most parents of mobility impaired children to own both a conventional wheelchair and the invention wheelchair.

Whereas a preferred embodiment of the invention has been illustrated and described in detail, it will be apparent that various changes may be made in the disclosed embodiment without departing from the spirit of the invention.

I claim:

1. A pediatric wheelchair comprising:

a powered base having opposed side faces, opposed front and rear faces, and opposed top and bottom faces, said top face defining a seat support surface, and said front, rear, side and bottom faces defining an interior compartment;

a pair of drive wheels each having a common diameter, said wheels being mounted for rotation with respect to said base proximate said from face thereof, said wheels having an axis of rotation located inboard of and parallel to said front face and spaced from a top face of said seating surface by a distance no greater than said drive wheel common diameter;

a seat mounted on said seat support surface proximate said front face of said base, and including front, rear and opposed side edges, a vertical back rest disposed parallel to said front face, and a horizontal seating surface, said seat being mounted on said base such that, when an occupant is seated on said seating surface with his back resting against the back rest, said wheelchair and occupant have a composite center of gravity generally vertically aligned with said occupant's trunk and located proximate said drive wheels so as to bias said base into said first, upright position;

an actuator unit disposed in said interior compartment tier actuating said drive wheels; and a control unit mounted on the wheelchair and accessible to the child for controlling movement of the wheelchair whereby slight forward shifting of said occupant with respect to said seat shifts the composite center of gravity of the wheelchair and the occupant to a point forward of said drive wheel axis, thereby pivoting said base into a second, forwardly tilted position, wherein said base defines a forward lower corner positioned forwardly of the axis of rotation of the drive wheels and radially outwardly of an outer periphery of the drive wheels, and the base is free to rotate forwardly and downwardly about the axis of rotation of the front drive wheels to said forwardly tilted position in which the forward lower corner of the frame base engages a floor supporting said wheelchair.

2. A wheelchair according to claim 1 wherein the seating surface is positioned directly over the axis of the drive wheels, the front edge of the seating surface being at least as far forwardly as the forward edge of the drive wheels, and the side edges of the seat extending laterally beyond the drive wheels.

3. A wheelchair according to claim 1 wherein the base further includes a front plate, the drive wheels include outboard faces, the front edge of the seat extends at least as far forwardly as the front plate, and the side edges of the seat extend at least as far outwardly as the outboard faces of the drive wheels.

4. A wheelchair according to claim 1 further including a footrest assembly positioned proximate the front face of the base and mounted for movement between an operative position in which the footrest assembly extends forwardly from the front face of the base and a stowed position in which the footrest assembly is positioned proximate the front face of the base, wherein the forward lower corner of the base is defined by the footrest with the footrest in its stowed position.

5. A wheelchair according to claim 1 and further including a pair of caster wheels mounted on said base proximate said rear face for swivel movement with respect thereto.

* * * * *